(12) United States Patent
Vallayer et al.

(10) Patent No.: US 10,677,692 B2
(45) Date of Patent: Jun. 9, 2020

(54) UNIT FOR GRINDING BIOLOGICAL SAMPLES

(71) Applicant: Bertin Technologies, Montigny le Bretonneux (FR)

(72) Inventors: Julien Vallayer, Gambais (FR); Julien Charpentier, Puteaux (FR)

(73) Assignee: Bertin Technologies, Montigny le Bretonneux (FR)

(*) Notice: Subject to any disclaimer, the term of this patent is extended or adjusted under 35 U.S.C. 154(b) by 344 days.

(21) Appl. No.: 15/511,077

(22) PCT Filed: Sep. 15, 2015

(86) PCT No.: PCT/FR2015/052463
§ 371 (c)(1),
(2) Date: Mar. 14, 2017

(87) PCT Pub. No.: WO2016/042252
PCT Pub. Date: Mar. 24, 2016

(65) Prior Publication Data
US 2017/0261411 A1    Sep. 14, 2017

(30) Foreign Application Priority Data

Sep. 17, 2014 (FR) .................................... 14 58774

(51) Int. Cl.
*G01N 1/28* (2006.01)
*B01F 11/00* (2006.01)
(Continued)

(52) U.S. Cl.
CPC .......... *G01N 1/286* (2013.01); *B01F 11/0028* (2013.01); *B01F 13/0052* (2013.01);
(Continued)

(58) Field of Classification Search
CPC ............ G01N 1/286; G01N 2001/2866; B01F 11/0028; B01F 13/0052; B01F 13/1041;
(Continued)

(56) References Cited

U.S. PATENT DOCUMENTS

| 7,101,077 | B2 | 9/2006 | Esteve et al. .................. 366/110 |
| 7,954,741 | B2 | 6/2011 | Kunc et al. ...................... 241/65 |

(Continued)

FOREIGN PATENT DOCUMENTS

| EP | 1 393 797 A2 | 3/2004 | ................ B01F 9/00 |
| FR | 2 872 233 A1 | 12/2005 | .............. F16C 19/55 |

(Continued)

OTHER PUBLICATIONS

International Search Report from corresponding International Patent Application No. PCT/FR2015/052463 dated Jan. 27, 2016.

*Primary Examiner* — Omar Flores Sanchez
(74) *Attorney, Agent, or Firm* — Kusner & Jaffe

(57) ABSTRACT

A unit for grinding biological samples, comprising a grinding device including at least two tubes having different volumes, suitable for being mounted on a support of the grinding device, each tube comprising an inner space having a height (h) along the axis of the corresponding tube, and being intended to contain samples to be ground, means for driving the support in a precession movement, the support having an axis the position of which varies by describing a cone, each tube being subjected to a movement (d) defined by the projection, onto the axis of said cone, of the distance between the extreme positions of a same point of the tube during the precession movement.

17 Claims, 15 Drawing Sheets

(51) Int. Cl.

| | | |
|---|---|---|
| *B02C 17/08* | (2006.01) | |
| *B02C 17/14* | (2006.01) | |
| *B01F 13/00* | (2006.01) | |
| *B01F 13/10* | (2006.01) | |
| *B01F 15/06* | (2006.01) | |
| *B02C 17/18* | (2006.01) | |

(52) U.S. Cl.
CPC ........ B01F 13/1041 (2013.01); B01F 15/065 (2013.01); B02C 17/08 (2013.01); B02C 17/14 (2013.01); B02C 17/1815 (2013.01); *B01F 2013/1086* (2013.01); *B01F 2015/061* (2013.01); *B01F 2215/0037* (2013.01); *B01F 2215/0431* (2013.01); *G01N 2001/2866* (2013.01)

(58) Field of Classification Search
CPC ............ B01F 13/065; B01F 2013/1086; B01F 2215/0037; B01F 2215/0431; B02C 17/08; B02C 17/14; B02C 17/1815
See application file for complete search history.

(56) References Cited

U.S. PATENT DOCUMENTS

| | | | | |
|---|---|---|---|---|
| 8,042,754 | B2 | 10/2011 | Mähler et al. | |
| 9,962,717 | B1 * | 5/2018 | Micic | B04B 5/0421 |
| 2005/0128863 | A1 * | 6/2005 | Esteve | B01F 11/0028 366/110 |
| 2006/0030032 | A1 * | 2/2006 | Zhang | B01F 11/0028 435/287.2 |
| 2006/0193198 | A1 * | 8/2006 | Bae | B01F 11/0014 366/111 |
| 2007/0064521 | A1 * | 3/2007 | Miszenti | B01F 11/0028 366/208 |
| 2007/0154125 | A1 * | 7/2007 | Boquet | B01F 11/0028 384/496 |
| 2010/0190663 | A1 * | 7/2010 | Li | B01F 11/0028 506/33 |
| 2011/0224338 | A1 * | 9/2011 | Maziers | B01F 7/00775 524/100 |
| 2012/0135846 | A1 * | 5/2012 | Yao | B01F 9/0001 494/13 |
| 2013/0042704 | A1 * | 2/2013 | Van Duyne | B04B 9/08 73/864.91 |
| 2014/0065018 | A1 * | 3/2014 | Imazu | G01N 35/04 422/73 |
| 2015/0265986 | A1 * | 9/2015 | Cutting | B01F 11/0458 366/265 |
| 2017/0292228 | A1 * | 10/2017 | Jones | B01F 3/14 |

FOREIGN PATENT DOCUMENTS

| | | | |
|---|---|---|---|
| JP | S61-53537 A | 3/1986 | |
| JP | 2001-178444 A | 7/2001 | ............ B02C 17/16 |
| JP | 2010-533577 A | 10/2010 | |
| JP | 2013-107024 A | 6/2013 | ............ B02C 17/14 |
| WO | WO 2004/012851 A2 | 2/2004 | ............ B01F 11/00 |
| WO | WO-2007/004652 A1 | 1/2007 | |
| WO | WO 2008/000962 A2 | 1/2008 | ................ B01L 7/02 |

* cited by examiner

UNIT FOR GRINDING BIOLOGICAL SAMPLES

FIELD OF THE INVENTION

The present invention relates to a unit for grinding biological samples.

BACKGROUND OF THE INVENTION

The documents WO-A-2004/012851 and FR-A-2 872 233 disclose a device for grinding biological samples, comprising a plate forming a support for tubes containing samples to be ground and means for driving the plate in a precession movement, the plate having an axis the position of which varies by describing a cone during the precession movement.

Such a device comprises concentric bearings mounted one inside the other for supporting and centring the tube-holder plate, these bearings being disposed between an elastically suspended part of the apparatus and a drive shaft carrying the plate.

The plate is immobilised with respect to rotation about the drive shaft so that the tubes containing the samples are subjected to a high-frequency curvilinear alternating movement and so that the samples that they contain are ground and homogenised by microbeads, for example glass or ceramic, contained with the samples in the tubes.

This type of grinding is very effective and very quick but has the drawback of a fairly great increase in the temperature of the samples in the tubes. Even when the tubes containing the samples are cooled prior to grinding, the temperature of the samples at the end of grinding may attain or exceed values of around 60° to 70°, at which some characteristics of the samples are irreversibly modified. This is the case for example with proteins, the activity of which is determined both by their sequence and by their three-dimensional structure, this structure being destroyed by heating.

In order to remedy this drawback, the document WO 2008/000962 discloses a grinding device of the aforementioned type and further comprising means for cooling the tubes, comprising a bell fixed inside a foldable cover of the apparatus and means for bringing cold air inside the bell.

These cooling means make it possible to maintain the samples at a temperature of a few degrees above zero at the end of grinding, so that the three-dimensional structure of the proteins contained in these samples is not altered.

There exists a need to be able to use various types of tube with the same grinding device, for example tubes with different volumes, while guaranteeing maximum grinding efficacy for each type of tube.

SUMMARY OF THE INVENTION

The present invention relates to a unit for grinding biological samples, comprising:

at least two tubes with different volumes, able to be mounted on a support of a grinding device, each tube comprising an internal space having a height along the axis of the corresponding tube and being intended to contain samples to be ground, a grinding device comprising a support able to support said at least two different tubes, means for driving the support in a precession movement, the support having an axis the position of which varies by describing a cone, each tube being subjected to a movement defined by the projection, onto the axis of said cone, of the distance between the extreme positions of the same point of the tube during the precession movement, the grinding device and the tubes being designed so that, for each tube, the d/h ratio is between 0.55 and 1, preferably between 0.6 and 0.8, even more preferentially between 0.6 and 0.7.

Studies carried out by the applicant made it possible to establish that such a ratio makes it possible to guarantee maximum grinding efficacy, whatever the type of tube used.

It should be noted that the aforementioned studies revealed that the efficacy is relatively constant on a plate situated between 0.6 and 1. Preferably, it is chosen to be placed at the start of the plate, that is to say at the minimum movement (and therefore at the minimum d/h ratio making it possible to provide maximum efficacy), namely close to 0.6. In this way, the energy necessary for grinding the samples is reduced and any degradation of the tubes and apparatus is avoided.

Said at least two tubes may comprise at least one first tube, the internal volume of which is between 1 and 5 ml, preferably around 2 ml.

Furthermore, said at least two tubes may comprise at least one second tube, the internal volume of which is between 5 and 10 ml, preferably around 7 ml.

In addition, said at least two tubes may comprise at least one third tube, the internal volume of which is between 10 and 20 ml, preferably around 14 ml.

Moreover, the tubes may be able to be mounted in orifices or housings in the support of the apparatus, the orifices or housings being situated along the same circumference centred on the axis of the support.

In this case, the support may comprise at least two housings or orifices with different diameters.

At least two housings or orifices with different diameters may be juxtaposed, at least partially.

Preferably, the support may comprise a fixed part and at least one part that is removable with respect to the fixed part, the tubes being able to be kept secured to the removable part in order to be able to be mounted on or extracted from the fixed part by mounting or retraction of the removable part with respect to the fixed part.

Such a feature makes it possible to withdraw or fit all the tubes easily.

The support may comprise first and second removable parts, each being intended for supporting a plurality of identical tubes, the first removable part enabling certain tubes to be supported and the second removable part enabling different tubes to be supported.

The grinding device may also comprise a locking member comprising at least one locking lug able to come into abutment on one end of a tube mounted on the support, in the locking position of the locking member, so as to hold a bearing surface of the tube against the support.

Each tube may for example comprise a collar forming a bearing surface of the tube, the locking lug bearing on one end of the tube, for example on a cap of the tube, in order to hold the collar in abutment on the support.

In this case, the grinding device may comprise aspiration means able to hold the locking member in its locking position. When the aspiration means are activated, then the locking member is in the locked position. Conversely, when the aspiration means are deactivated, then the locking member may be unlocked and removed from the support. In this way the locking or unlocking of the locking member is facilitated.

The grinding device may comprise a fixed frame on which the support is mounted movably, a cover being mounted on the frame and defining with said frame at least one enclosure in which the support and the tubes mounted on the support are housed, the grinding device further comprising means for bringing cold air inside said enclosure.

In this case, the cover may comprise an internal wall and an external wall between which a thermal insulation space is provided. Each wall may have the form of a bell open in the direction of the frame.

Furthermore, the thermal insulation space may contain a gas, such as for example air.

Moreover, the cover or the frame may comprise a gasket at least partially providing a seal at the interface between the cover and the frame, said interface comprising at least one zone with no gasket so as to enable an air flow to leave the enclosure.

Finally, the air supply means may comprise an air inlet nozzle mounted on the cover, said nozzle emerging in the enclosure.

The invention will be understood better and other details, features and advantages of the invention will emerge from a reading of the following description given by way of non-limitative example with reference to the accompanying drawings.

DETAILED DESCRIPTION OF THE INVENTION

Figure 1:
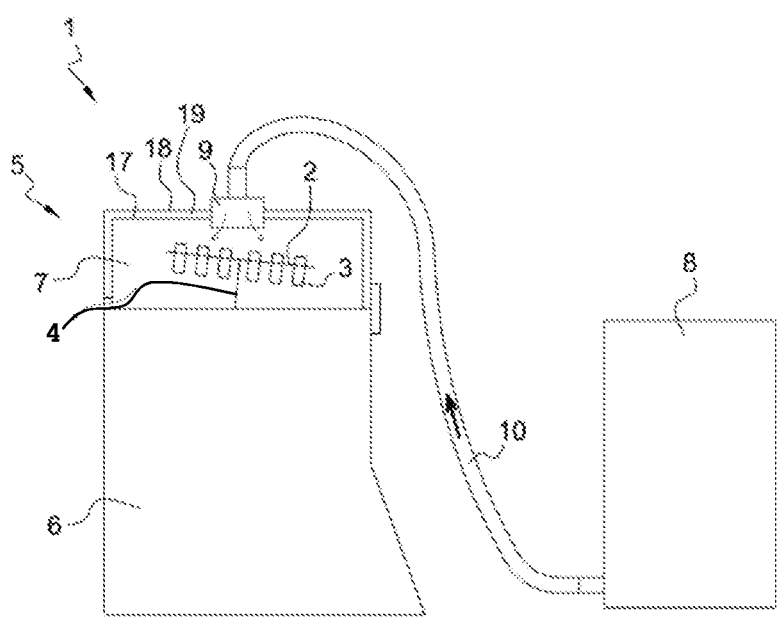
FIG. 1 is a schematic view of a grinding device of a unit according to the invention.

FIG. 1 shows a grinding device 1 that is similar to the one described in the document. FR-A-2 872 233 and comprises essentially a support 2 carrying tubes 3 at its periphery and mounted at the end of a shaft 4 driven so as to effect a precession movement.

The shaft 4 is supported and centred on an elastically suspended part of the device 1 by means of a system of concentric bearings mounted one inside the other, comprising a rocker and ball bearing carried by the shaft and turning inside two axially superimposed ball bearings as described in the document FR-A-2 872 233.

The device 1 also comprises a cover 5 carried by a frame or fixed bodywork 6, the cover 5 being able to pivot between an open position in which it leaves clear access to the support 2, in particular with a view to placing the tubes 3 on the support 2 or removing said tubes 3, and a closed position in which the cover defines with said frame 6 an enclosure 7 in which the support 2 and the tubes 3 mounted on the support 2 are housed, with a view to the grinding of the samples contained in the tubes 3. Locking means make it possible to hold the cover 5 in the closed position shown in FIG. 1 during the grinding of the samples.

To avoid the samples contained in the tubes 3 being raised during their grinding to a high temperature by microbeads made from glass, ceramic or any other suitable material contained in the tubes, the grinding device 1 also comprises means for bringing cold air inside said enclosure 7. These means comprise in particular a unit 8 for producing cold air connected to a nozzle 9 for injecting cold air inside the enclosure 7, by means of a thermally insulated conduit 10, for example by means of an external duct.

The support 2 comprises more particularly a fixed part 11 (see in particular FIG. 6) forming a circular plate, from which a shaft 4 extends radially from the centre of said plate 11, the shaft 4 extending along the axis X of the support 2 and of the plate 11.

Figure 2:
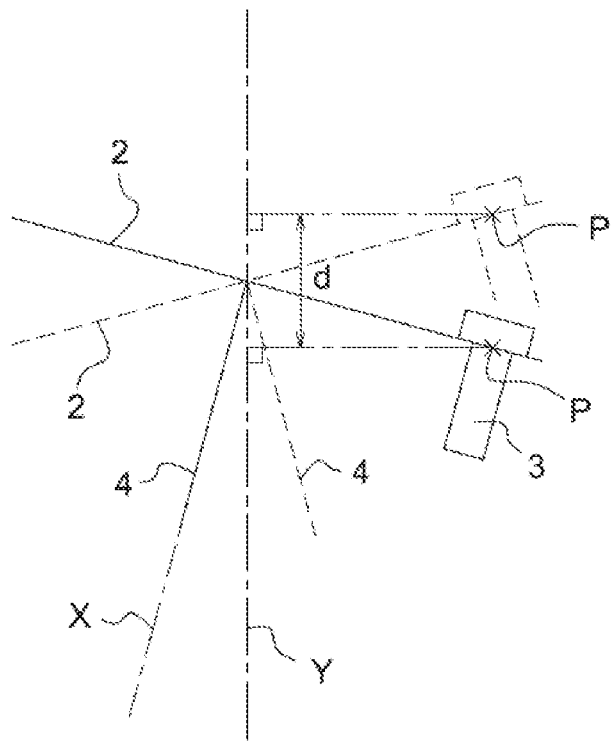
FIG. 2 is a schematic side view illustrating the two extreme positions of e support and of a tube mounted on the support.

FIG. 2 shows the extreme positions of the support 2 during its precession movement. During such a movement, the rotation of the support 2 about its axis X is prevented or limited. However, during such a precession movement, the shaft 4 or the axis X of the support 2 moves cyclically along a cone of axis Y. In the embodiment shown in the figures, the axis Y is horizontal but could also be inclined with respect to the horizontal.

If a point P on the tube 3 is considered, the movement d designates the projection, onto the axis Y of said comic, of the distance between said extreme positions of the point P on the tube 3.

Figure 3:
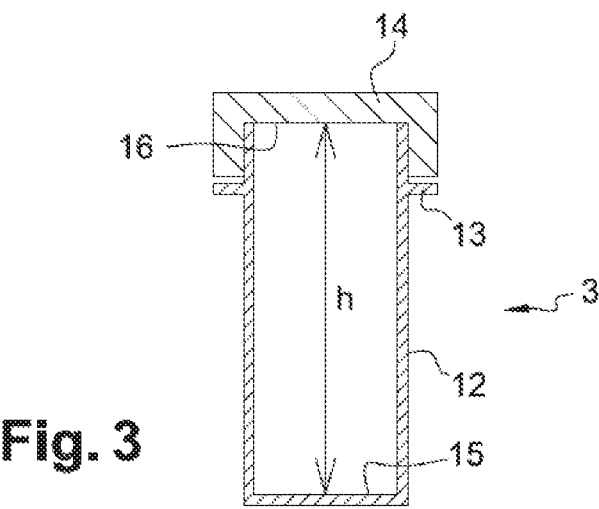
FIG. 3 is a view in axial section of a tube.

FIG. 3 shows an embodiment of a tube 3 that can be used, this comprising a substantially cylindrical hollow body 12, opening at one end and comprising a collar 13 extending radially towards the outside on the same side as the opening end and situated axially recessed with respect to said opening end.

A cap 14 is also screwed onto said opening end. h designates the height of the cylindrical internal space of the tube 3, that is to say the axial dimension of said internal space, from the bottom wall 15 of the tube 3 as far as the bottom wall 16 of the cap 14.

Figure 4:
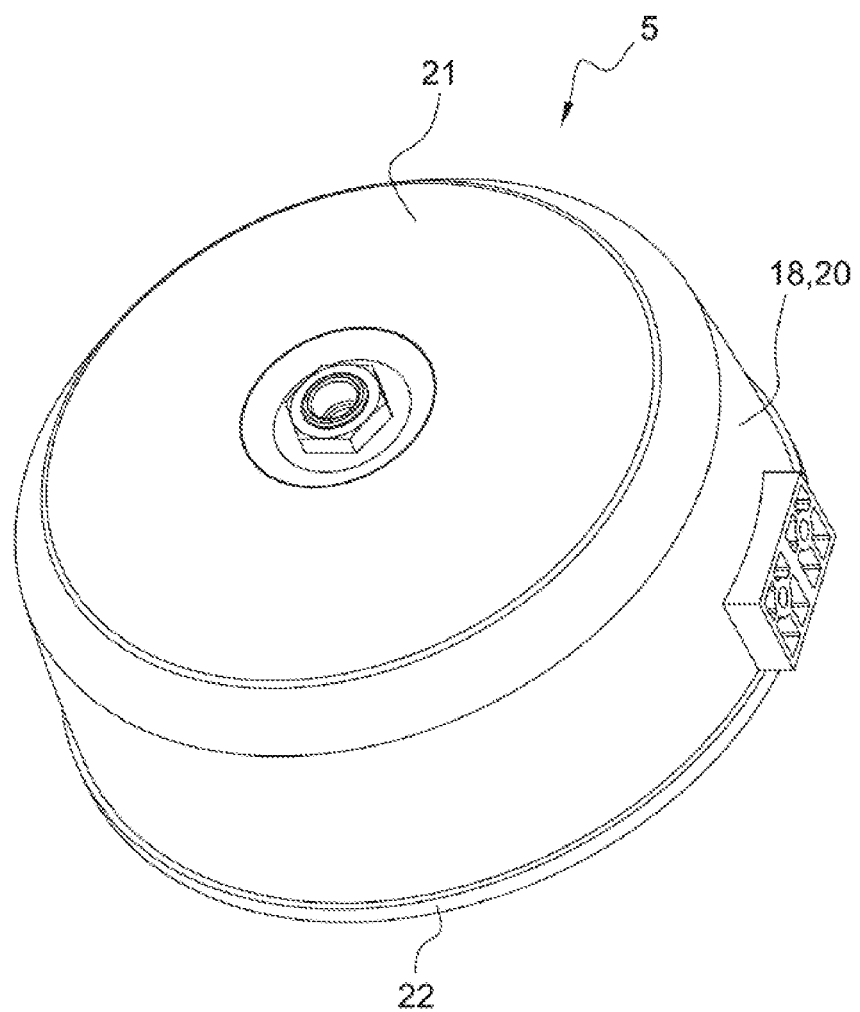
FIG. 4 is a perspective plan view of a cover according to the invention.
Figure 5:
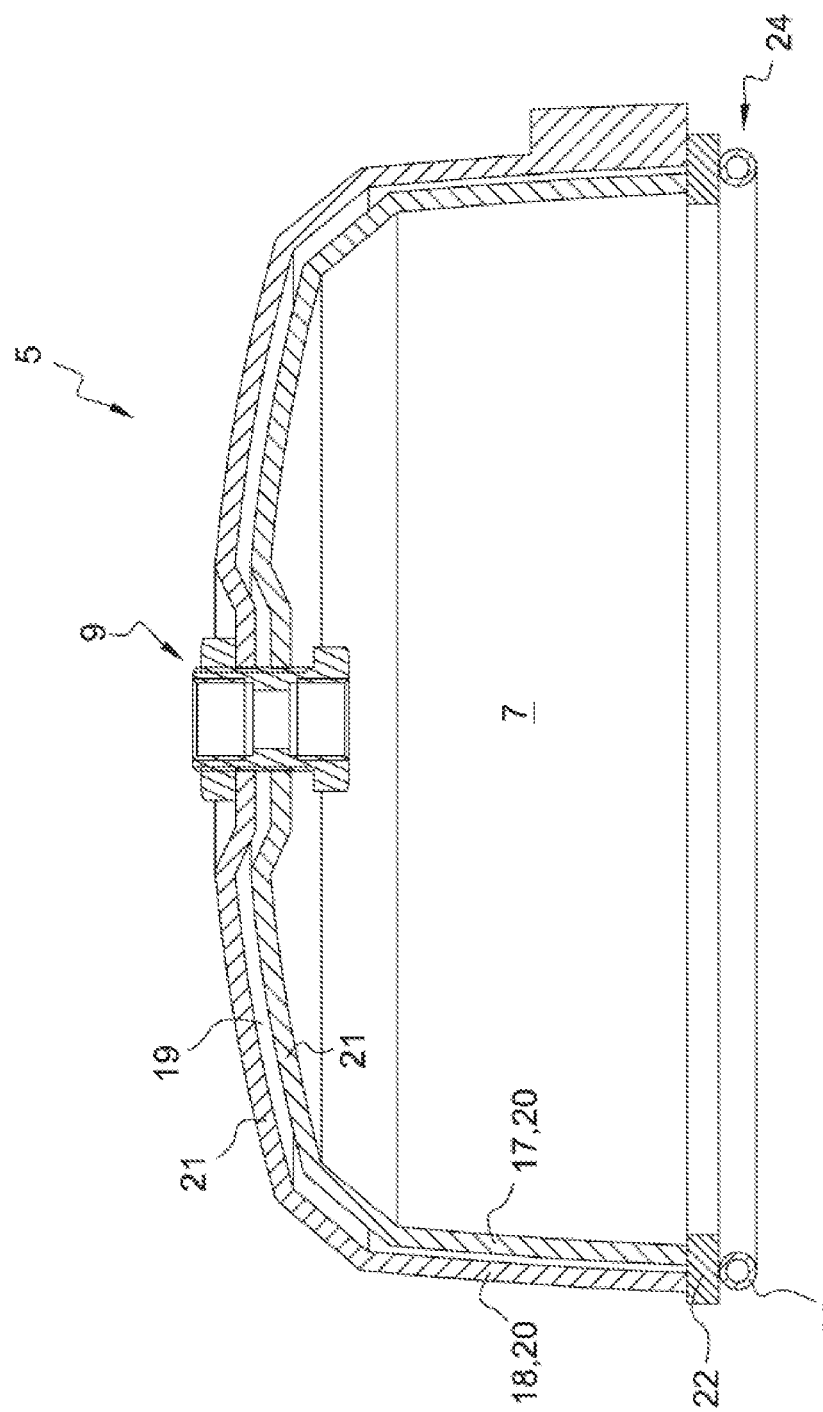
FIG. 5 is a view in axial section of the cover in FIG. 4.

FIGS. 4 and 5 show an embodiment of the cover 5, this comprising internal and external walls 17, 18 in the form of bells, mounted concentrically one in the other and delimiting between them a closed insulation space 19 filled with a gas, such as for example air.

In particular, each wall 17, 18 comprises a lateral annular surface 20, substantially cylindrical or frustoconical, and a bottom surface 21 extending roughly radially or able to be convex or concave. The free ends of the lateral surfaces 20 of the two walls 17, 18 are connected to each other sealingly and form a so-called bottom edge 22.

The nozzle 9 for injecting cold air is situated at the centre of the bottom surfaces 21 and passes through the internal 17 and external 18 walls, said nozzle 9 being able to inject air in a homogeneous or multidirectional fashion into the enclosure 7.

A gasket 23 (FIG. 5) extends along almost the whole length of the bottom edge 22. In the closed position of the cover 5, the bottom edge 22 and the gasket 23 bear on a support zone of the fixed frame 6. The bottom edge 22 comprises a zone 24 with no gasket 23 so as to enable an air flow to emerge from the enclosure 7.

Figure 6:
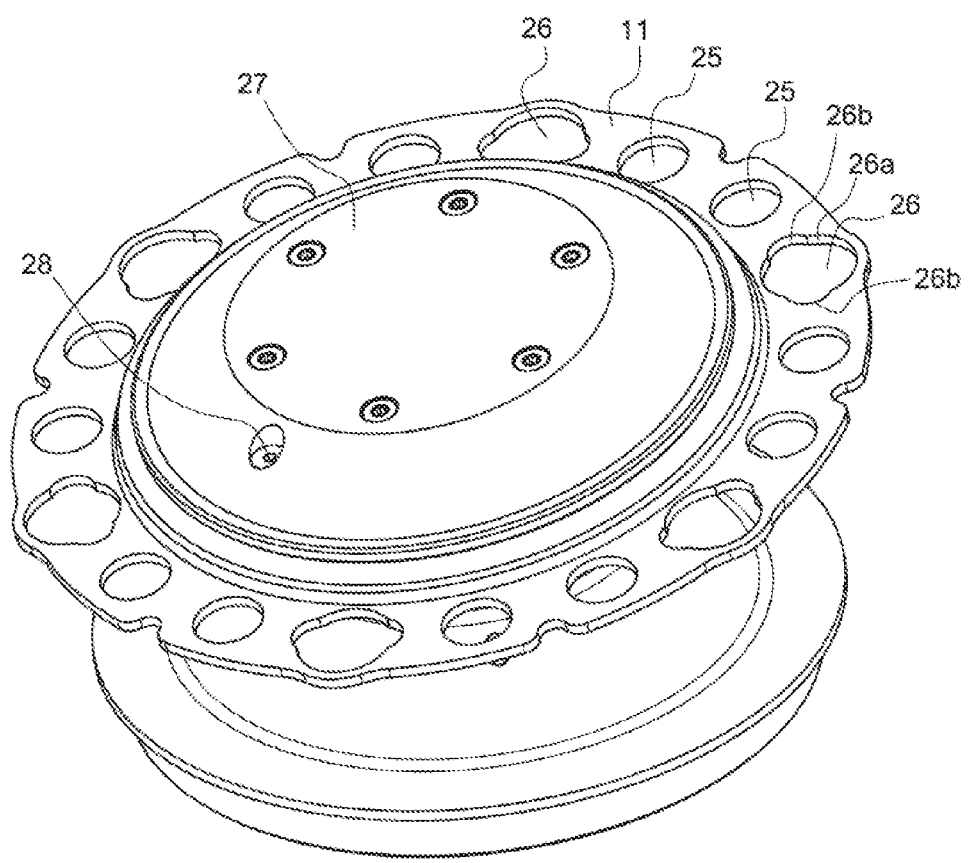
FIG. 6 is a perspective view of a part of the grinding device illustrating in particular the fixed part of the support.

FIG. 6 shows the fixed part or plate 11 of the support 2, said fixed part 11 comprising orifices at the external periphery. More particularly, the fixed part comprises twelve orifices 25 with a first diameter and six orifices 26, the cross section of which has a particular profile. This is because the orifices 26 are formed by the juxtaposition or superimposition of a central circular opening 26a with a second diameter and two lateral circular openings 26b with a third diameter. Each orifice 26 thus comprises a central part 26a and two lateral parts 26b.

Two orifices 25 are interposed in each case circumferentially between two orifices 26, the various orifices 25, 26 being offset from each other and evenly distributed over the entire circumference, substantially on the same diameter. The central part 27 of the fixed part 11 of the support 2 comprises an aspiration nozzle 28 connected to a controlled aspiration pump, not shown, housed in the frame 6.

Figure 7:
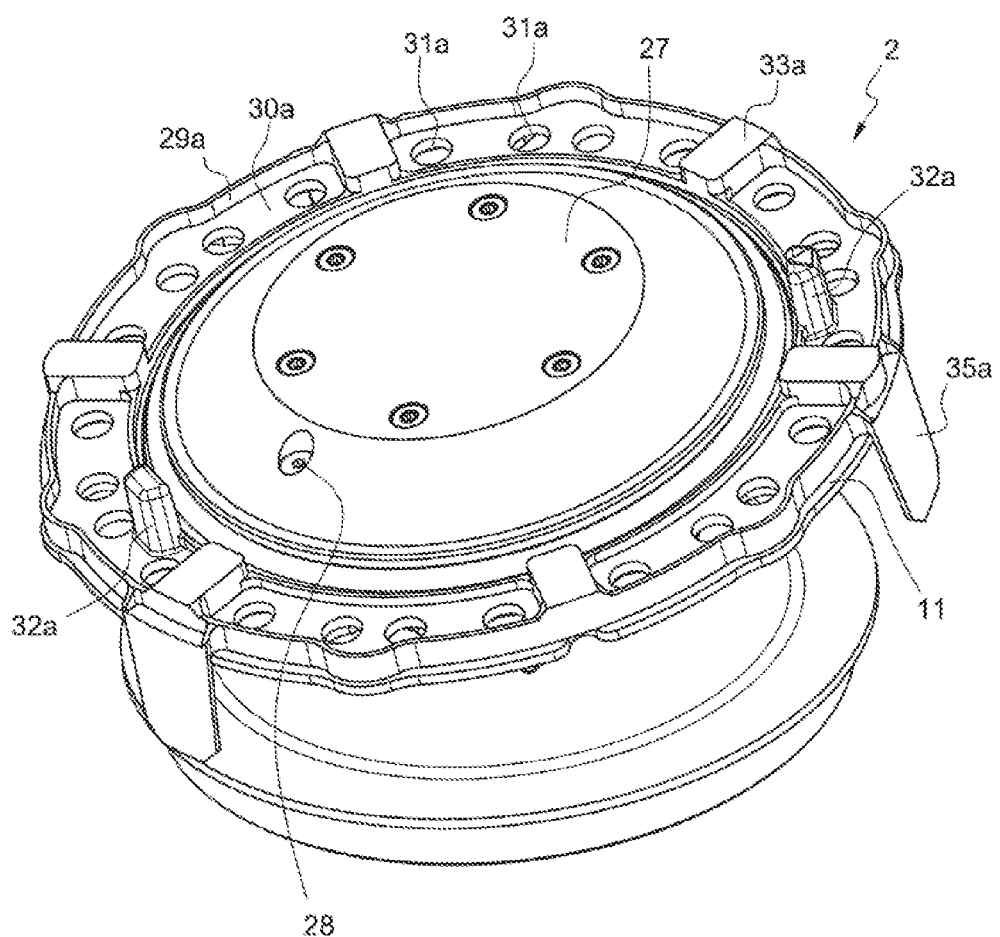
FIG. 7 is a view corresponding to FIG. 6 in which a first removable part intended to support a first type of tube is mounted on the fixed part of the support.

FIG. 7 illustrates the positioning of a first part 29a of the support 2 on the fixed part 11. The first removable part 29a is annular and comprises a radial surface 30a in which orifices 31a are provided, 24 in number and with a diameter corresponding substantially to the diameter of the body of a first type of tube 3a, namely tubes 3a with a volume of between 1 and 5 ml, preferably around 2 ml.

The first removable part 29a further comprises:
  means for angularly positioning the first removable part 29a with respect to the fixed part 11,
  positive-location pins 32a extending upwards and/or downwards,
  six support pins 33a extending upwards, serving as a support for a locking member and evenly distributed over the circumference, between orifices 31a,
  four tongues 35a extending downwards, evenly distributed over the circumference and used to bear on a surface such as a working surface.

The orifices 31a of the first removable part 29a are disposed opposite the orifices 25 and lateral parts 26b of the orifices 26.

Figure 8:
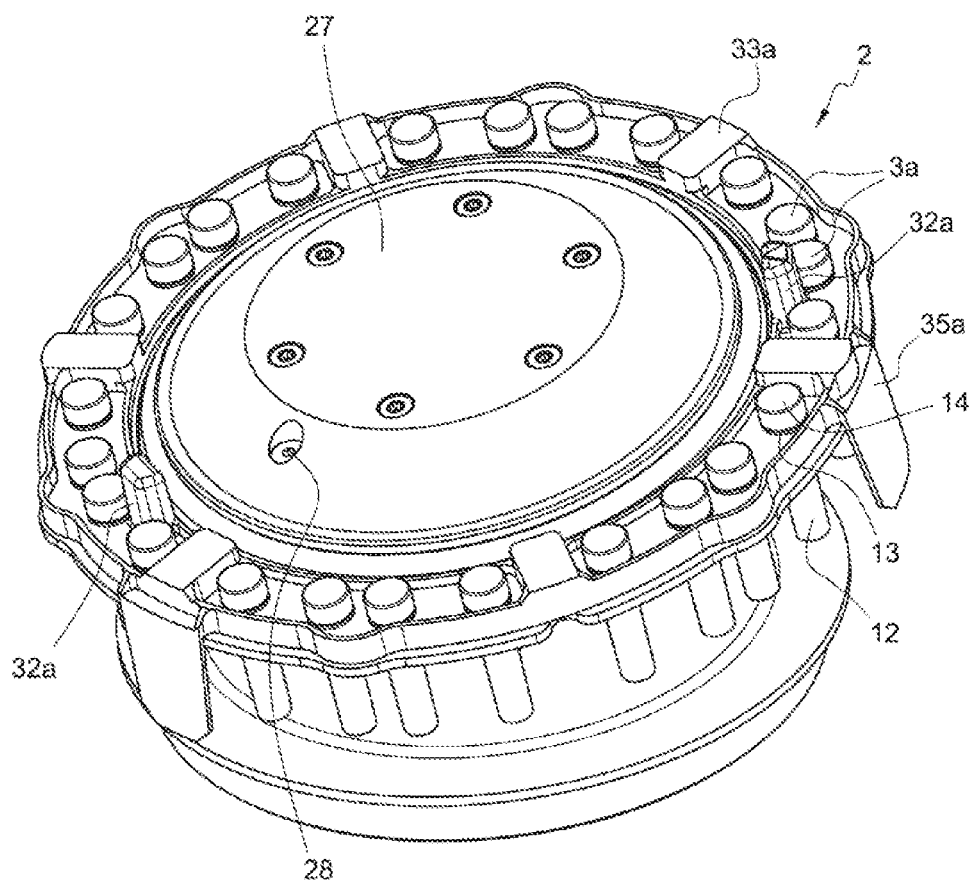
FIG. 8 is a view corresponding to FIG. 7, in which the first tubes are mounted in the first removable part and in the first fixed part.
Figure 9:
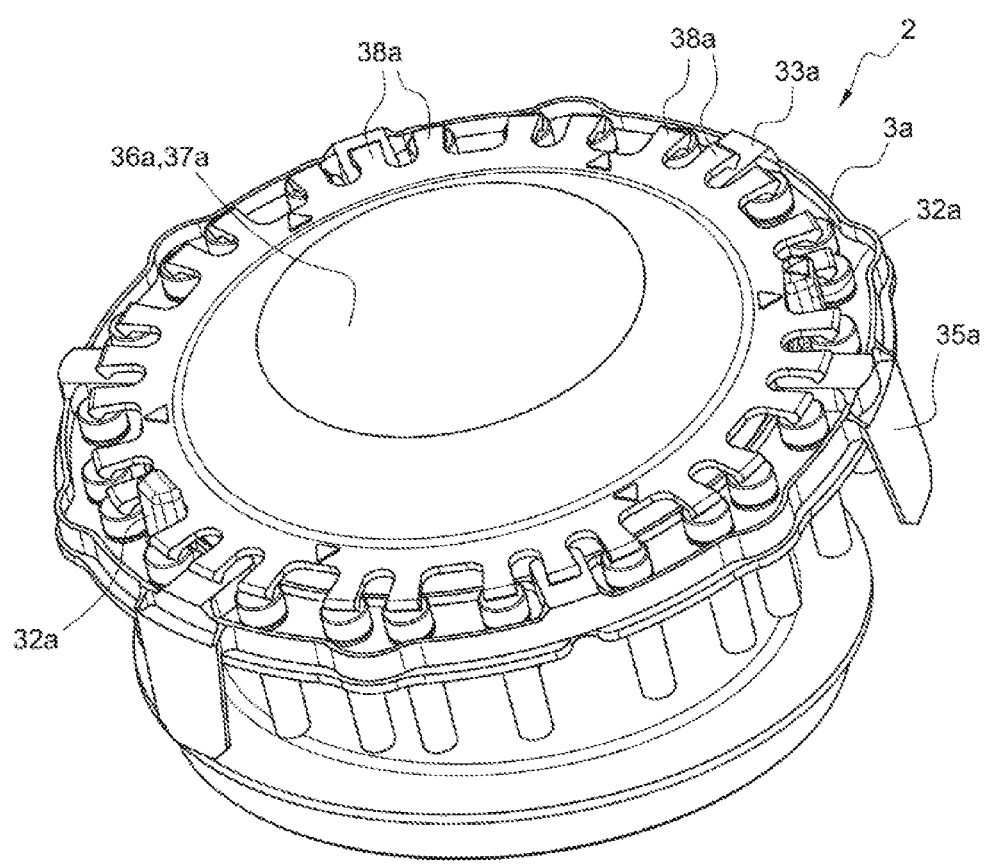
FIG. 9 is a view corresponding to FIG. 8, in which a first locking member is mounted on the first removable part and is in its locking position.

FIG. 8 shows the tubes of the first type 3a mounted on the support 2, in particular inside the corresponding orifices 25, 26, 31a of the removable part 29a and of the fixed part 11.

In particular, the mounting can be done as follows.

First of all, the first movable part 29a may be placed on a horizontal surface, so that the free ends of the tongues 35a rest on said surface. The bodies 12 of the tubes 3a can next be engaged in the orifices 25, 26, 31a, until the collars 13 rest on the radial surface 30a. The height of the tongues 35a is adapted so that the tubes 3a are suspended by their collars 13 during this step.

The assembly formed by the first movable part 29a and the tubes 3a of the first type can next be mounted on the fixed part 11 of the support 2, in the position illustrated in FIG. 8.

A first locking member 36a is next positioned on the first removable part 29a and on the tubes 3a. More particularly, the first locking member 36a comprises a circular central part 37a from which lugs 38a extend radially outwards. Some of the lugs 38a delimit between them wider recesses, used for introducing the positive-location pins 32a. In this way, after positioning of the first locking member 36a, it is checked that the lugs 38a are situated opposite the tubes 3a, more particularly opposite the caps 14 of the tubes 3a.

The central part 37a of the first locking member 36a is situated opposite the central part 27 of the fixed part 11 of the support 2, and more particularly opposite the aspiration nozzle 28. In this way, once the first locking member 36a is in position, the aspiration pump can be started, which has the effect of pressing the lugs 38a of the first locking member 36a on the caps 14 of the tubes 3a so that the tubes 3a are kept in abutment by their collars 14 on the radial surface 30a. In this case also, some of the lugs 38a of the locking member 36a come into abutment on the pins 33a, so as to lock the removable part 29a of the support 2. The tubes 3a are thus effectively held in position during the precession movement of the support 2, without risk of damage to the tubes 3a.

Figure 10:
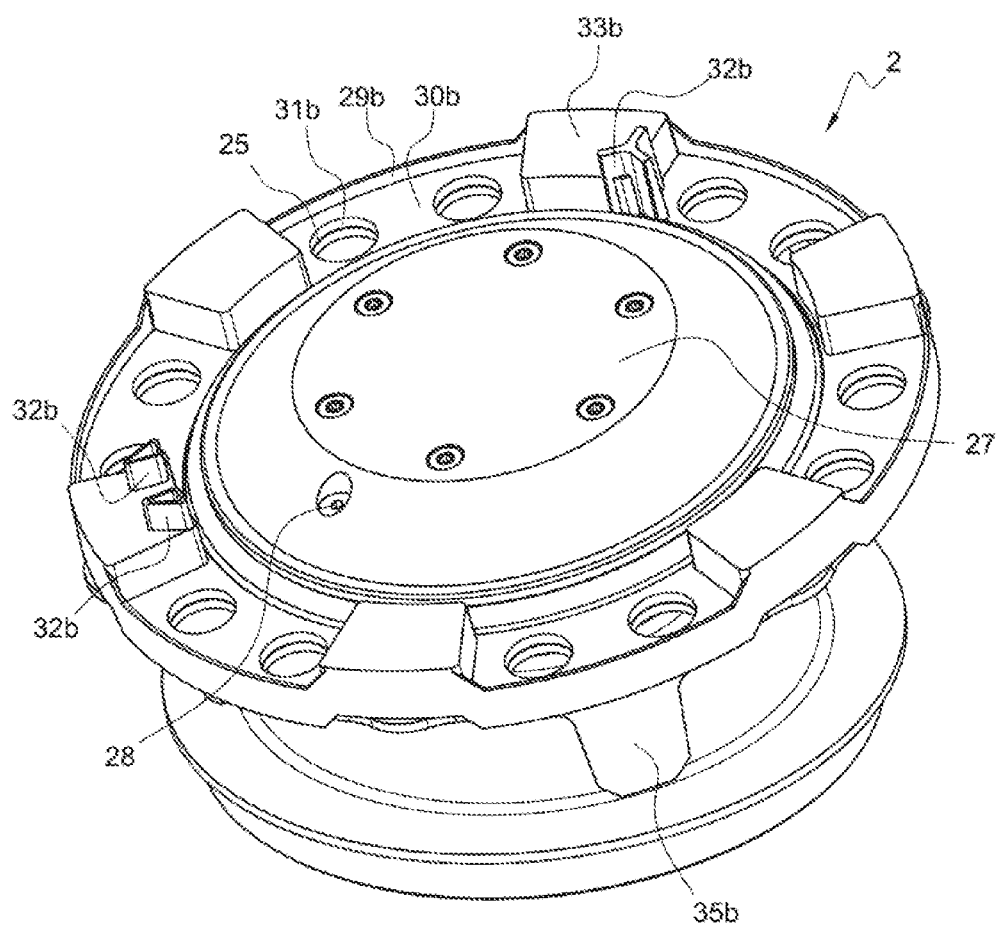
FIGS. 10 to 12 are views corresponding respectively to FIGS. 7 to 9, illustrating the use of a second removable part of the support, of a second type of tube and of a second locking member.
Figure 11:
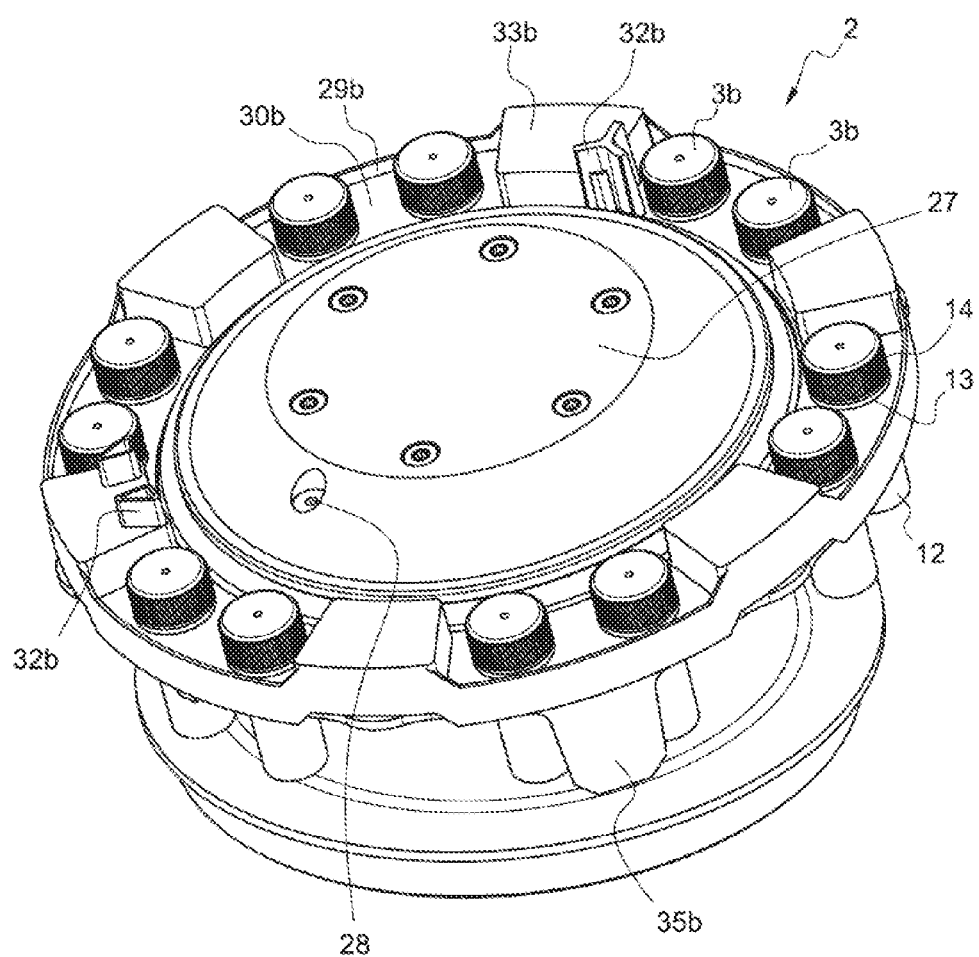
Figure 12:
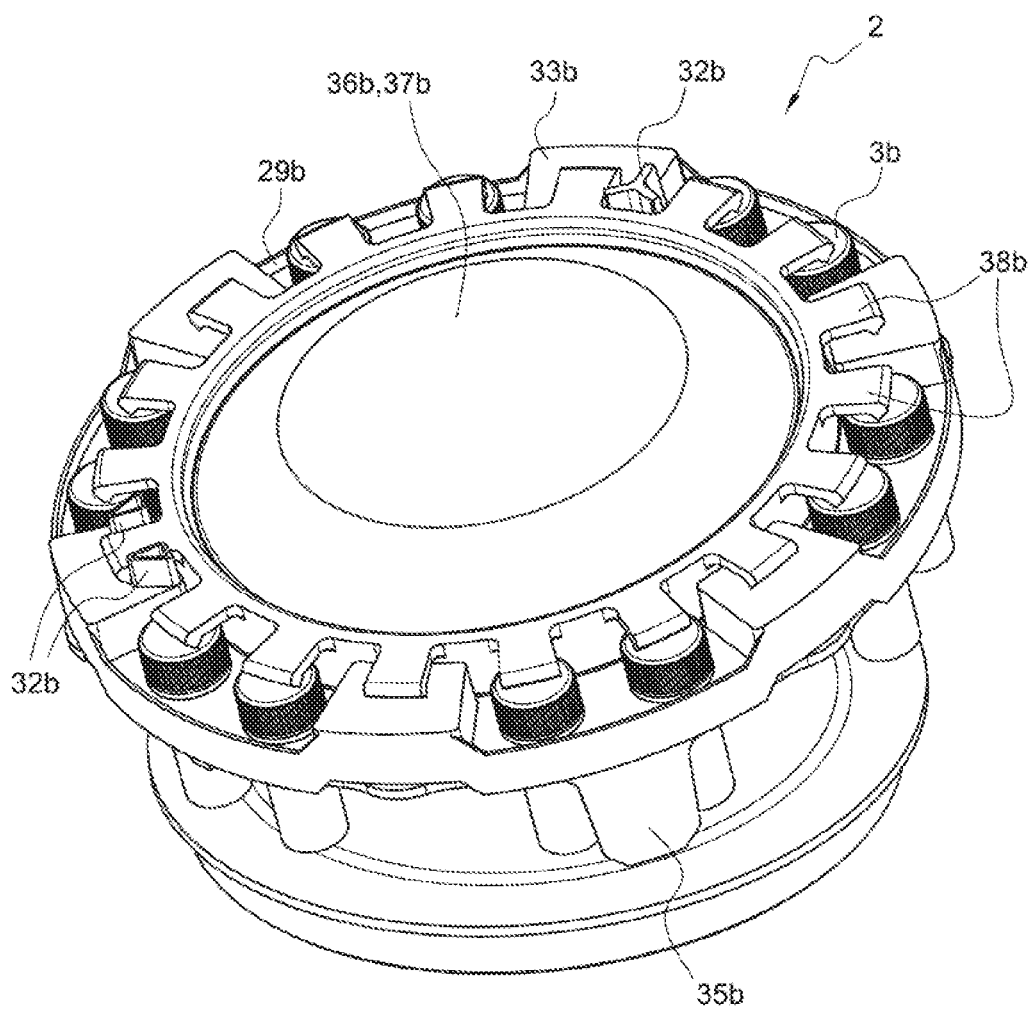

FIGS. 10 to 12 illustrate the mounting of a second type of tube 3b, namely tubes 3b with a volume of between 5 and 10 ml, preferably around 7 ml, by means of a second movable part 29b of the support 2 and a second locking member 36b.

The second movable part 29b differs from the first movable part 29a through the number and size of the orifices 31b. The second movable part 29b thus comprises 12 orifices 31b, the diameter of the orifices 31b being suited to the outside diameter of the body 12 of the tubes 3b of the second type. In the position shown in FIG. 10, the orifices 31b of the second movable part 29b are disposed opposite the orifices 25 of the fixed part 11 and have the same diameter as them.

The positions of the lugs 38b of the second locking member 36b are therefore adapted accordingly, in order to be situated opposite the tubes 3b of the second type and the pins 33b of the second removable member 29b, in the position illustrated in FIG. 12.

Figure 13:
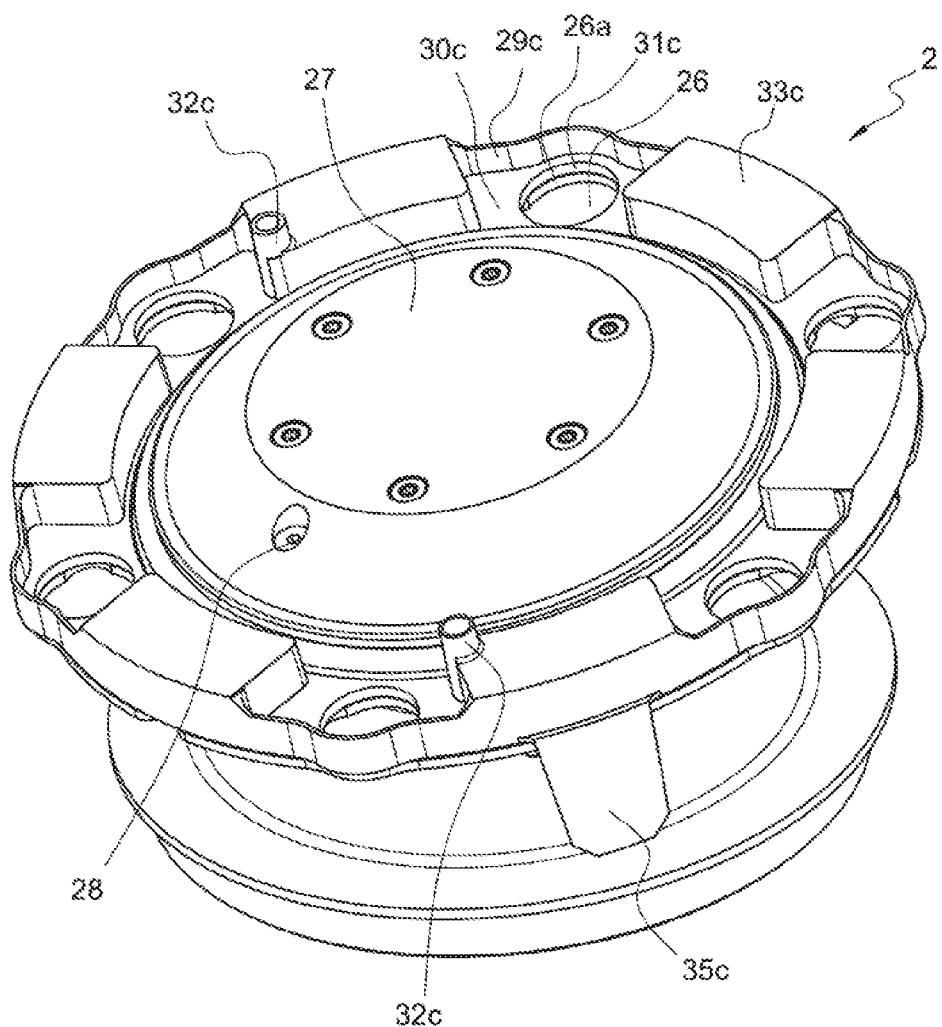
FIGS. 13 to 15 are views corresponding respectively to FIGS. 7 to 9, illustrating the use of a third removable part of the support, of a third type of tube and of a third locking member.
Figure 14:
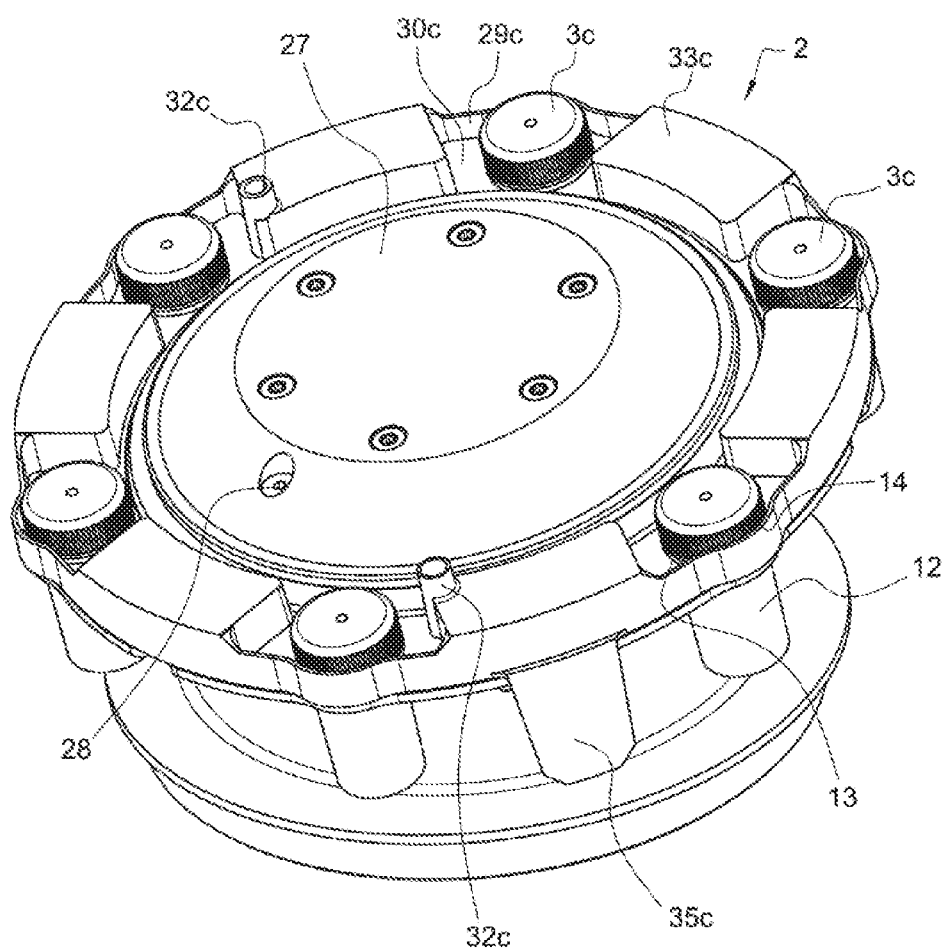
Figure 15:
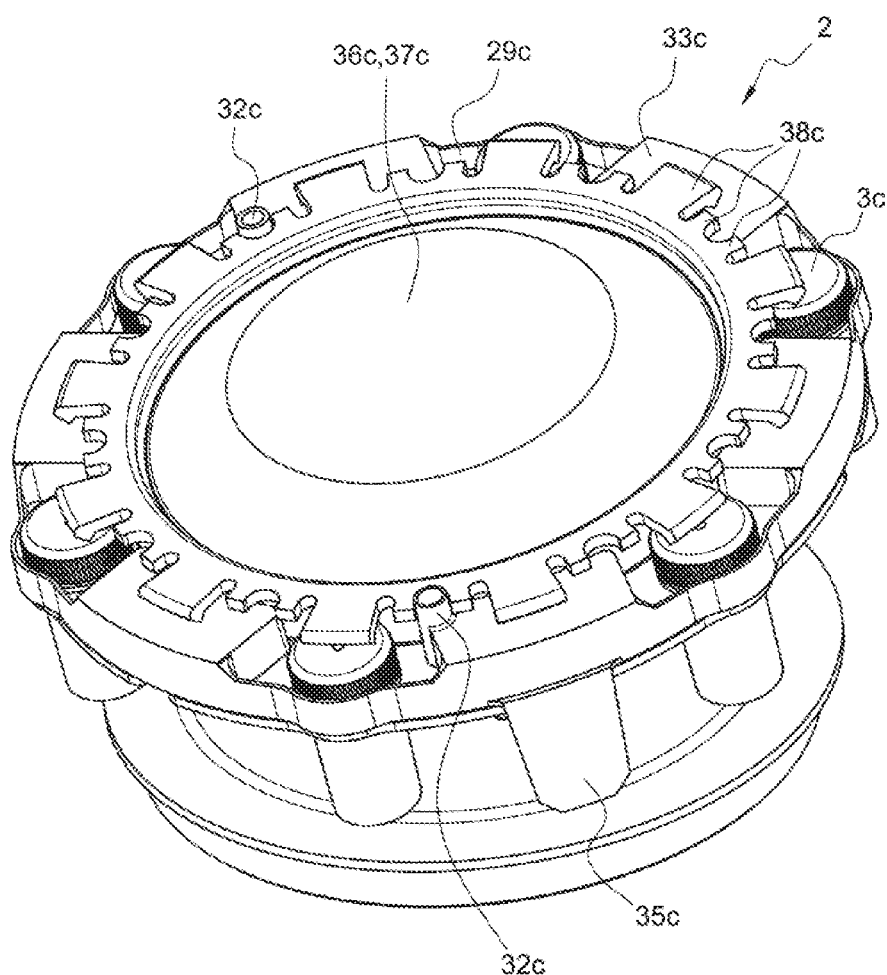

FIGS. 13 to 15 illustrate the mounting of a third type of tube 3c, namely tubes with a volume of between 10 and 20 ml, preferably around 14 ml, by means of a third movable part 29c of the support 2 and a third locking member 36c.

The third movable part 29c differs from the first movable part 29a through the number and size of the orifices 31c. The third movable part 29c thus comprises six orifices 31c, the diameter of the orifices 31c being suited to the outside diameter of the body 12 of the tubes 3c of the third type. In the position shown in FIG. 13, the orifices 31c of the third movable part 29c are disposed opposite the central openings 26a of the orifices 26 of the fixed part 11.

The positions of the lugs 38c of the third locking member 29c are therefore adapted accordingly, in order to be situated opposite the tubes 3c of the third type and the pins 33c of the third removable member 36c, in the position illustrated in FIG. 15.

The applicant carried out a series of tests, the purpose of which was to analyse the influence of the ratio of the movement d to the height h of the tube 3 (d and h having been defined previously), hereinafter denoted the ratio d/h, on the efficacy of the grinding.

For this purpose, the efficacy of the grinding was evaluated visually. Lentil grains were used as a sample to be ground in the study carried out by the applicant. The more effective the grinding, the finer the particles of the sample obtained after grinding. The mark obtained increases with the efficacy of the grinding and therefore decreases with the size of the particles obtained after grinding.

Figure 16:
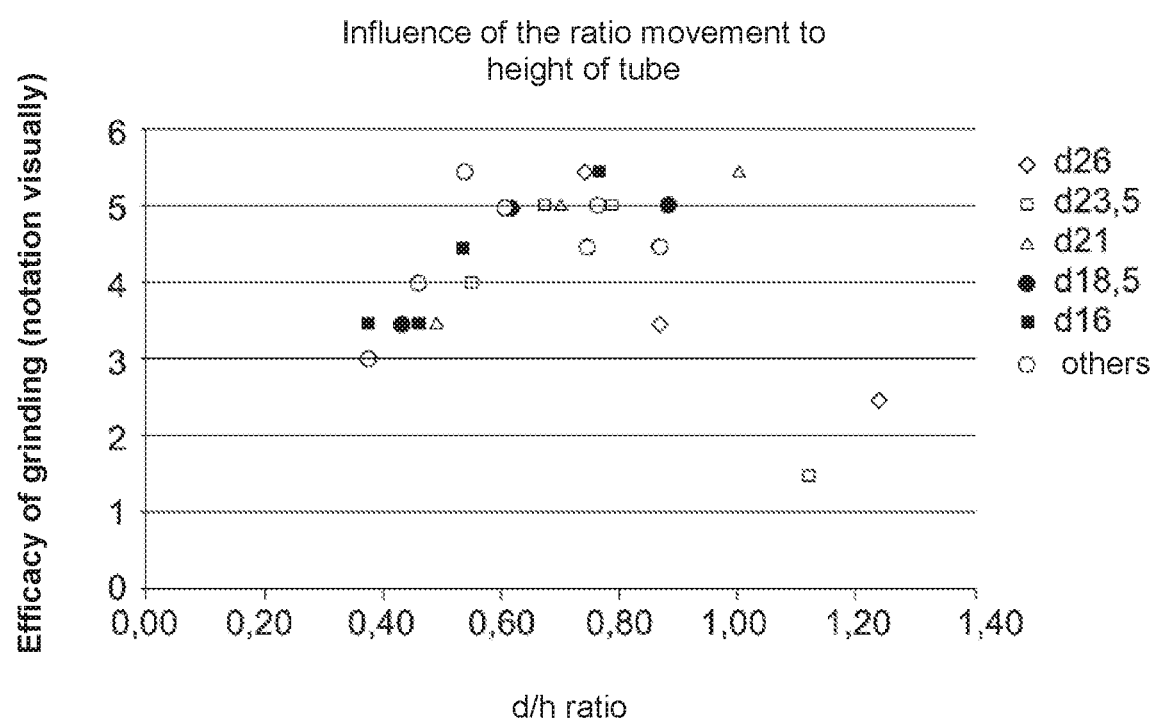
FIG. 16 is a diagram representing the change in efficacy of the grinding as a function of the aforementioned d/h ratio, for a plurality of movements d.

The diagram in FIG. 16 thus illustrates the efficacy of the grinding as a function of the ratio d/h, each point on the diagram being the result of a test. In carrying out the various tests, the parameters other than the ratio d/h were kept substantially identical (size and material of the beads, material of the tube, temperature, speed of movement of the support 2, etc.).

A plurality of movements were studied, namely in particular a movement d of 26 mm (points referenced d26 on the diagram), a movement d of 23.5 mm (points referenced d23), a movement d of 21 mm (points referenced d21), a movement d of 18.5 mm (points referenced d18.5) and a movement d of 16 mm (points referenced d16).

It is clear from this study that maximum efficacy is obtained when the ratio d/h is between 0.55 and 1, preferably between 0.6 and 0.8, even more preferentially between 0.6 and 0.7. The efficacy of grinding is greatly reduced outside the aforementioned ranges of values.

It will be noted that the efficacy is relatively constant on a plateau situated between 0.6 and 1. Preferably, a position at the start of the plateau is chosen, that is to say at minimum movement (and therefore at the minimum ratio d/h making it possible to provide maximum efficacy), namely close to 0.6. In this way, the energy necessary for grinding the samples is reduced and any damage to the tubes and apparatus is prevented.

For the same movement and for orifices and tubes 3 situated on the same circumference, it is therefore necessary to use types of tube 3a, 3b, 3c having the said height h.

Having described the invention, the following is claimed:

1. A unit for grinding biological samples, comprising:
   at least two tubes with different volumes, said at least two tubes mountable on a support of a grinding device, each tube comprising an internal space having a height (h) along the axis of the corresponding tube and being intended to contain samples to be ground,
   a grinding device including:
      the support for supporting said at least two tubes, the support having an axis, the position of the axis varying by describing a cone, and
      an actuator for driving the support in a precession movement,
   wherein each tube is subjected to a movement (d) defined by a projection, onto the axis of said cone, of the distance between the extreme positions of a same point of the tube during the precession movement,
   wherein the grinding device and the at least two tubes are configured such that, for each tube, the d/h ratio is between 0.55 and 1.

2. The unit according to claim 1, wherein said at least two tubes comprise at least one first tube having an internal volume that is between 1 and 3 ml.

3. The unit according to claim 1, wherein said at least two tubes comprise at least one second tube having an internal volume that is between 5 and 10 ml.

4. The unit according to claim 1, wherein said at least two tubes comprise at least one third tube having an internal volume that is between 10 and 20 ml.

5. The unit according to claim 1, wherein the at least two tubes are mountable in orifices or housings in the support of the grinding device, the orifices or housings being situated along the same circumference centered on the axis of the support.

6. The unit according to claim 5, wherein the support comprises at least two housings or orifices having different diameters.

7. The unit according to claim 6, wherein at least two housings or orifices having different diameters are at least partly juxtaposed.

8. The unit according to claim 1, wherein the support comprises a fixed part and at least one part that is removable with respect to the fixed part, the at least two tubes are able to be kept secured to the removable part in order to be mounted on or removed from the fixed part by mounting or removal of the removable part with respect to the fixed part.

9. The unit according to claim 8, wherein the at least one removable part of the support comprises first and second removable parts, each removable part intended to support a plurality of identical tubes, the first removable part supporting some tubes and the second removable part supporting different tubes.

10. The unit according to claim 1, wherein the grinding device further comprises a locking member having at least one locking lug able to come into abutment on one end of a tube mounted on the support in the locking position of the locking member, so as to hold a bearing surface of the tube against the support.

11. The unit according to claim 1, wherein the grinding device further comprises an aspiration nozzle for holding the locking member in its locking position.

12. The unit according to claim 1, wherein the grinding device further comprises:
   a fixed frame on which the support is mounted movably,
   a cover being mounted on the frame and defining with said frame at least one enclosure in which the support and the at least two tubes mounted on the support are housed, and
   an air source for bringing cold air inside said enclosure.

13. The unit according to claim 12, wherein the cover comprises an internal wall and an external wall between which a thermal insulation space is provided.

14. The unit according to claim 13, wherein the thermal insulation space contains a gas.

15. The unit according to claim 12, wherein the cover or the frame comprises a gasket at least partially providing a seal at the interface between the cover and the frame, said interface comprising at least one zone with no gasket so as to enable air to emerge out of the enclosure.

16. The unit according to claim 12, wherein the air source for bringing cold air inside said enclosure includes an air inlet nozzle mounted on the cover, said nozzle emerging in the enclosure.

17. The unit according to claim 14, wherein the gas is air.

* * * * *